A. P. AND C. R. YOUNG.
POT COVER.
APPLICATION FILED JUNE 10, 1920.

1,414,540.

Patented May 2, 1922.

Clarence R. Young,
Amos P. Young,
Inventors:

attys.

UNITED STATES PATENT OFFICE.

AMOS P. YOUNG AND CLARENCE R. YOUNG, OF LEESBURG, INDIANA.

POT COVER.

1,414,540.  Specification of Letters Patent.  Patented May 2, 1922.

Application filed June 10, 1920. Serial No. 388,079.

*To all whom it may concern:*

Be it known that we, AMOS P. YOUNG and CLARENCE R. YOUNG, citizens of the United States, residing at Leesburg, in the county of Kosciusko and State of Indiana, have invented certain new and useful Improvements in Pot Covers, of which the following is a specification.

Our invention relates particularly to pot covers of a perforated or ventilating type and our objects are, first, to provide such a cover so designed as to afford an exit for steam and vapors and yet prevent the spattering or popping out of grease or other contents of the covered skillet or vessel; second, to provide a pot cover adapted to prevent the boiling over of certain liquids such as milk, syrups, and certain fruits, vegetables, cereals, etc., such as tomatoes or rice; third, to provide a means of return to the covered container of any liquid which may emerge on the top of the cover through the perforations, and fourth, to provide a pot cover permitting the introduction of a liquid into the covered receptacle through the cover.

Figure 1:
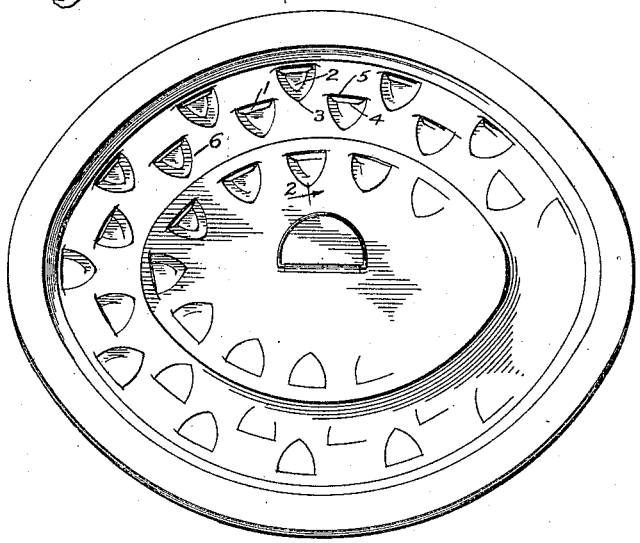
Figure 2:
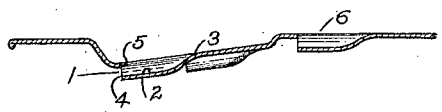

These and other objects and advantages as will appear more fully hereinafter we attain by providing a pot cover with a number of perforations with adjacent drainage basins as shown in the accompanying drawings of which Fig. 1 is a perspective and Fig. 2 a cross-sectional view, and in which corresponding parts are designated by the same reference characters. Reference character (1) designates the perforation and the reference character (2) designates the adjacent drainage basin, the perforation and adjacent basin constituting the unit of perforation design, designated by reference character (6).

The complete improved ventilating pot cover consists essentially of the common pot cover provided with a number of these perforation units, the number and arrangement of which being determined by the size of the cover and varied at the discretion of the designer.

The essential conditions imposed upon the detail in design of these perforation units are first, that the perforation proper must be long and narrow by comparison and its plane of extension must lie approximately perpendicular to the surface of the cover; second, that the drainage basin must present a sloping surface from the top of the basin or point of least indention, indicated in the drawings by reference character (3) to the bottom of the basin or position of greatest indentation, indicated in the drawings by reference character (4), which must terminate at and constitute the lower edge of the perforation, and third, the perforations should be located toward the outer edge of the cover with the adjacent drainage basins extending from them toward the center of the cover.

The reasons and advantages of these conditions of design are that in order to prevent splattering and popping out of grease or other contents of the covered skillet or container, it is necessary to provide a cover offering obstruction to such particles being projected and any perforations in the cover would have to lie in a plane parallel to the paths of the projected particles. At the position of the cover it is assumed that these paths would be approximately perpendicular to the surface of the cover and hence the perforations are designed to lie in a plane perpendicular to the cover and parallel to incident paths of emissions of grease or other contents.

The perforations are then located toward the outer edge of the cover with their openings directed toward the center of the cover, and also further provided with the adjacent drainage basins extending in the same direction.

The action then with regard to emissions of grease or other contents of a covered container is that the only source of any projected particles possible of escaping through the perforations would necessarily be confined to the area of the skillet or container extending from directly below the perforations to the extreme outer edge of such skillet or container and from this small area such particles would have to be projected at the exact angle to escape through a narrow slit or opening lying approximately perpendicularly to the surface of the bottom of the skillet. It is therefore practically impossible for any of such particles to be projected through the perforations, but in event there should be any such escape of same, they would be projected in the direction toward the center of the cover and hence would fall somewhere on the cover, and not on the stove or hands of the cook. In such case also the various drainage basins adjacent to the perforations would act as catch basins and return any such escaping particles back into the container through the perforations.

It is perfectly obvious, of course, that the perforations allow free exit of all steam and vapors.

One object of the invention is thus obtained by permitting the frying of meats, mush, vegetables, and many other foods in a skillet or vessel covered with this ventilating type of cover, thus preventing the splashing and popping out of the grease or other contents upon the stove or hands and still allowing the free exit of steam and vapors and preventing the objectionable steaming of the food unavoidable with the use of a common pot cover.

Other objects and advantages of the invention especially as pertaining to the prevention of the boiling over of liquids are quite obvious upon consideration of the principle of ventilation provided.

Many liquids such as milk, syrups, and water solutions containing certain cereals, fruits, and vegetables, as in boiling rice, tomatoes, etc., are particularly susceptible to boiling over when the containing vessel is covered with the common pot cover. Our improved ventilating type of cover is especially adapted for covering boiling liquids of this character, for the objectionable feature of "boiling over" is prevented, because of the ventilation provided. Any of the liquids emerging through the perforations is immediately returned to the containing vessel by the drainage basins through the perforations.

It is also evident that a liquid may be introduced into a receptacle covered with our improved device without its removal. This is safely and conveniently accomplished by simply pouring the liquid directly on the top of the cover where it immediately seeks the lower levels of the drainage basins and enters the covered receptacle through the adjacent perforations.

In these ways together with modifications we secure our principal objects with obvious advantages in providing an improved pot cover of novel and superior construction facilitating the better preparation of foods and eliminating the objectionable features incident to the use of the common type of covers or to their prohibitive uses.

Having thus described our invention, we claim as new and desire to secure by Letters Patent—

1. A pot cover provided with an elevated rim forming an annular depression inwardly adjacent thereto, said annular depression provided with a series of slits extending parallel with the rim, the inner edges of said slits being vertically depressed forming vertically extending perforations opening toward the center of the cover.

2. A one-piece metallic pot cover with an elevated rim, provided with a series of depressed basins, terminating at their outer edges in perforations opening toward the center of the cover.

3. A slightly arched pot cover with an elevated rim designed to fit upon the top edge of a receptacle to be covered, provided with a series of perforations arranged in concentric rows around the outer area of the cover within the elevated rim, said perforations provided with adjacent depressed segments extending toward the center of the cover constituting drainage basins terminating in and coordinating with said perforations to facilitate the introduction of a liquid into the covered receptacle through the improved cover.

In testimony that we claim the foregoing as our invention we have signed our names in the presence of two subscribing witnesses.

AMOS P. YOUNG.
CLARENCE R. YOUNG.

Witnesses:
MARION GOSHORN,
MAURICE BECKNELL.